United States Patent
Kerger et al.

[19]

[11] Patent Number: 6,131,877
[45] Date of Patent: Oct. 17, 2000

[54] AUTOMATIC SHUT-OFF DEVICE FOR A VALVE FOR COMPRESSED OR LIQUEFIED GASES

[75] Inventors: Leon Kerger, Helmdange; Jean-Claude Schmitz, Heisdorf, both of Luxembourg

[73] Assignee: Luxembourg Patent Company, S.A., Luxembourg

[21] Appl. No.: 09/350,722

[22] Filed: Jul. 9, 1999

[51] Int. Cl.[7] ............................. F16K 31/08; F16K 15/00
[52] U.S. Cl. ..................... 251/65; 137/901; 137/533.11
[58] Field of Search ............................. 251/65; 137/901, 137/533.11

[56] References Cited

U.S. PATENT DOCUMENTS

| | | | |
|---|---|---|---|
| 2,576,168 | 11/1951 | Allen | 251/65 |
| 2,693,933 | 11/1954 | Meinke | 251/65 |
| 3,794,868 | 2/1974 | Haigh | 33/0 |
| 4,670,939 | 6/1987 | Fisher | 16/297 |
| 5,586,589 | 12/1996 | Voelker | 141/396 |

*Primary Examiner*—Kevin Shaver
*Assistant Examiner*—David Bonderer
*Attorney, Agent, or Firm*—Leydig, Voit & Mayer

[57] ABSTRACT

The shut-off device is intended for refillable gas cylinders. In order to be sure that only authorized persons can refill the cylinder, the filling device comprises a non-return valve element (16) which prevents filling and which can only be neutralized using a special magnet (18).

2 Claims, 2 Drawing Sheets

AUTOMATIC SHUT-OFF DEVICE FOR A VALVE FOR COMPRESSED OR LIQUEFIED GASES

FIELD OF THE INVENTION

The present invention relates to an automatic shut-off device for a valve for compressed or liquefied gases comprising a valve body designed to be mounted on a gas cylinder and provided with an internal passage that allows the cylinder to be filled with pressurized gas.

BACKGROUND OF THE INVENTION

Although not restricted thereto, the invention is more specifically aimed at a valve of the type described in patent U.S. Pat. No. 5,282,496. This patent relates to a valve for refillable cylinders and which comprises a level-regulating valve to prevent it from being possible for the cylinder to be filled beyond a certain limit, for example 80% of its maximum capacity, so as to avoid potential risks of an accident.

However, there are still risks of an accident either if the cylinders are refilled by non-specialists and do not have level-regulating valves as proposed in the aforementioned patent, or if they are refilled with an inappropriate gas or if the user manages to neutralize the level-regulating valve, or even for other reasons.

SUMMARY OF THE INVENTION

The object of the present invention is to provide a simple and effective automatic shut-off device for a valve like the one described in the background and which prevents a gas cylinder from being filled by a non-specialist or unauthorized individual who does not possess special equipment.

In order to achieve this object, the invention provides an automatic shut-off device as described in the background is characterized in that the internal passage has, on the opposite side to the cylinder, a widened cross section containing a metallic ball of a diameter greater than the diameter of the passage and which acts as a non-return valve element by blocking the passage in the direction of filling, and in that said valve element can be neutralized by shifting the ball sideways under the effect of a magnetic field generated by a magnet placed on the outside of the valve.

The valve body may comprise a section of high magnetic permeability around the metallic ball, so as to strengthen the influence that the magnetic field has on the ball.

In consequence, any attempt at filling the cylinder is bound to fail given that the ball, under the effect of its own weight and the pressure of the filling gas, is pressed against its seat which is formed by the upper edge of the passage and closes the passage toward the inside of the cylinder. Only somebody who knows how to open the passage and is in possession of an appropriate magnet will be able to carry out filling once he has moved the ball off its seat using this magnet.

Any attempt at filling the cylinder with the cylinder lying on its side is also bound to fail. Admittedly, by lying the cylinder down the passage can be opened because the ball, under the effect of its own weight, moves off its seat, but the pressure of the filling gas returns the ball onto its seat and automatically closes the passage.

Other specific features of the invention will emerge from the description of an advantageous embodiment, presented below by way of an illustration, with reference to the appended drawings in which:

BRIEF DESCRIPTION OF THE INVENTION

FIG. 1 depicts a partial section view through the body of a valve provided with an automatic shut-off device according to the present invention in the shut off position and FIG. 2 is a view similar to that of FIG. 1 but during the neutralization phase.

DETAILED DESCRIPTION OF THE INVENTION

Figure 1:
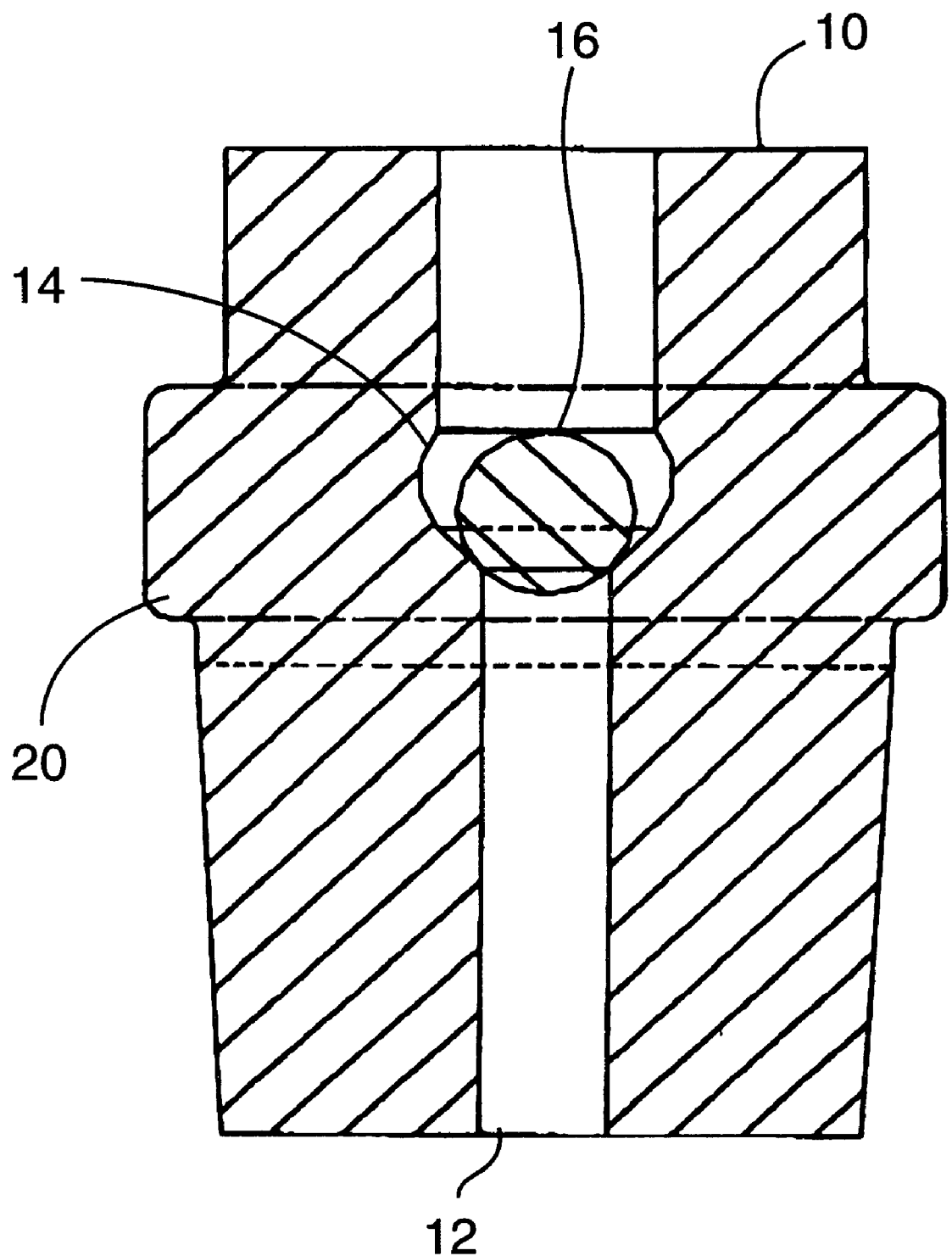

The reference 10 denotes part of a valve designed to be mounted on a refillable gas cylinder. The reference to a gas cylinder is not restrictive and extends to cover all kinds of reservoir. This may be a valve as described in patent U.S. Pat. No. 5,282,496 or any other device allowing the cylinder to be refilled, with or without a level-regulating valve, operating as a two-way valve or a one-way valve.

The body 10 has an axial passage 12 communicating with the inside of the cylinder, not depicted. At a certain point, this passage ends in a widened portion 14 containing a spherical metallic ball 16, preferably made of special steel. This ball normally rests on its seat which is formed by the upper edge of the passage 12 and therefore prevents filling gas from entering the cylinder.

Figure 2:
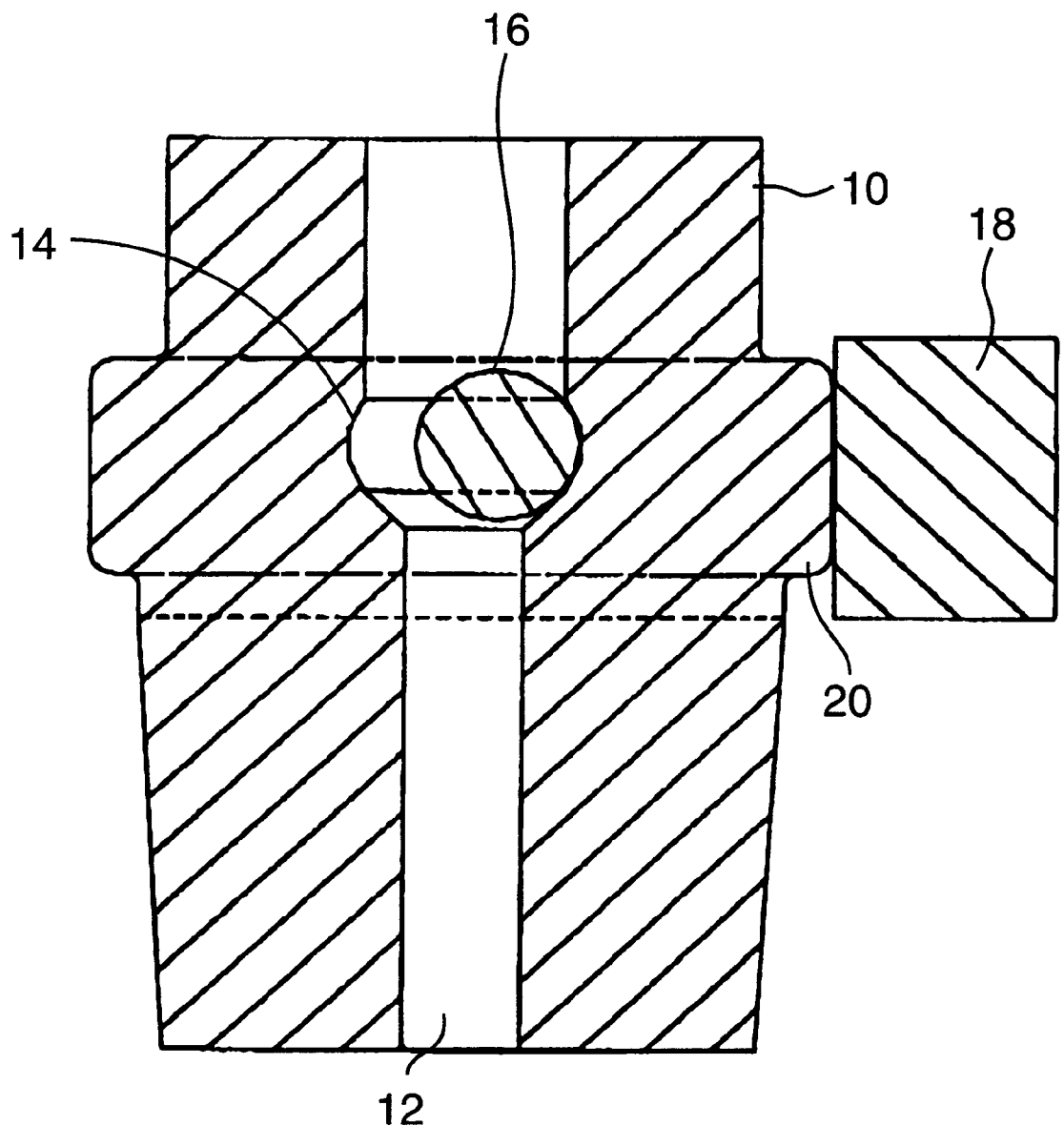

FIG. 2 shows the neutralizing of the device using a powerful magnet 18 which is brought up close to the body 10 of the valve in the region of the ball 16 and whose field is powerful enough to move the ball 16 off its seat and open the passage to the filling gas. The magnet 18 may be a simple permanent magnet. However, the body 10 may have a section 20 of high magnetic permeability near the ball 16, so as to enhance the influence that the magnet 18 has on the ball 16.

In order to further complicate the task of anybody wishing to discover how to neutralize the shut-off system and who may avail himself of a magnet in order to be able to fill the cylinder, it is possible to provide a hole in the wall of the body 10, on the outside, into which hole the magnet has to be introduced. This hole could extend as far as close to the widened portion 14, and would then have the advantage of bringing the magnet even closer to the ball 16.

This hole would have a special cross section, so that the magnet would have to have a corresponding complementary cross section. Furthermore, an axial rod could be provided in the bottom of the hole, so that the magnet that had to be introduced into the hole would have to have a corresponding bore in its head so that it could be introduced into the hole. It would therefore be impossible to neutralize the shut-off system using a commercially-available magnet.

What is claimed is:

1. Automatic shut-off device for a valve for compressed or liquefied gases comprising a valve body (10) designed to be mounted on a gas cylinder and provided with an internal passage (12) that allows the cylinder to be filled with pressurized gas, characterized in that the internal passage (12) has, on the opposite side to the cylinder, a widened cross section (14) containing a metallic ball (16) which acts in the direction of filling, and in that said valve element can be neutralized by shifting the ball (16) sideways under the effect of a magnetic field generated by a magnet (18) placed on the outside of the valve and wherein the widen cross section (14) extends over 360° completely around the internal passage (12) such that the magnet (18) can be placed at any angular orientation to shift the ball (16) and neutralize the valve element.

2. Device according to claim 1, characterized in that the valve body (10) comprises a section of high magnetic permeability around the ball (16).

* * * * *